United States Patent
Hannes

(10) Patent No.: US 11,570,422 B2
(45) Date of Patent: Jan. 31, 2023

(54) METHOD FOR CALIBRATING A SENSOR UNIT OF AN INDUSTRIAL TRUCK

(71) Applicant: Jungheinrich Aktiengesellschaft, Hamburg (DE)

(72) Inventor: Bistry Hannes, Pinneberg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 17/185,026

(22) Filed: Feb. 25, 2021

(65) Prior Publication Data

US 2021/0274149 A1 Sep. 2, 2021

(30) Foreign Application Priority Data

Feb. 27, 2020 (DE) ...................... 10 2020 105 215.4

(51) Int. Cl.
| | |
|---|---|
| *H04N 13/246* | (2018.01) |
| *B66F 9/075* | (2006.01) |
| *H04N 5/225* | (2006.01) |
| *H04N 5/232* | (2006.01) |

(52) U.S. Cl.
CPC ......... *H04N 13/246* (2018.05); *B66F 9/0755* (2013.01); *H04N 5/2253* (2013.01); *H04N 5/23296* (2013.01)

(58) Field of Classification Search
CPC ............... H04N 13/246; H04N 5/2253; H04N 5/23296; B66F 9/0755
USPC ........................................................ 348/148
See application file for complete search history.

(56) References Cited

U.S. PATENT DOCUMENTS

| | | | |
|---|---|---|---|
| 2003/0044047 A1 | 3/2003 | Kelly et al. | |
| 2011/0218670 A1* | 9/2011 | Bell | B66F 9/20 700/215 |
| 2012/0026324 A1* | 2/2012 | Kiyoshige | G01S 19/14 348/231.3 |
| 2016/0090285 A1 | 3/2016 | Svensson et al. | |
| 2017/0316253 A1* | 11/2017 | Phillips | G06V 20/56 |
| 2018/0089517 A1* | 3/2018 | Douglas | G06T 7/74 |
| 2019/0339067 A1* | 11/2019 | Sanami | H04N 5/2226 |
| 2020/0061811 A1* | 2/2020 | Iqbal | B25J 9/161 |
| 2020/0279397 A1* | 9/2020 | Cheng | G06V 10/225 |

FOREIGN PATENT DOCUMENTS

| | | |
|---|---|---|
| DE | 10 2008 027 701 A1 | 10/2009 |
| EP | 3 219 663 A1 | 9/2017 |

* cited by examiner

*Primary Examiner* — Rebecca A Volentine
*Assistant Examiner* — Matthew David Kim
(74) *Attorney, Agent, or Firm* — Barclay Damon LLP

(57) ABSTRACT

A method for calibrating a sensor unit disposed on a load-bearing device of an industrial truck includes the steps of: determining a first position of the sensor unit relative to an object located remotely from the industrial truck, displacing the sensor relative to the object in a first direction by a first distance, determining a second position of the sensor unit relative to the object, determining the spatial position or arrangement of the sensor unit relative to the load-bearing device based on the first and second positions, the direction of movement, and the distance between the first and second positions.

20 Claims, 2 Drawing Sheets

METHOD FOR CALIBRATING A SENSOR UNIT OF AN INDUSTRIAL TRUCK

CROSS REFERENCE TO RELATED DISCLOSURE

This application is based upon and claims priority to, under relevant sections of 35 U.S.C. § 119, German Patent Application No. 10 2020 105 215.4, filed Feb. 27, 2020, the entire contents of which are hereby incorporated by reference.

BACKGROUND

The disclosure relates to a method for calibrating a sensor unit arranged on a load-bearing device of an industrial truck. In this case, the method includes a calibration means for determining the spatial arrangement, or position, of the sensor unit relative to the load-bearing device.

Sensor units are typically arranged on the load-bearing device of an industrial truck in order to recognize load carriers to be picked up by the load-bearing device. This makes it possible, for example, for the load-bearing device or the entire industrial truck to be automatically oriented relative to the load carrier, and in particular, for the load carrier to be picked up by the industrial truck. The sensor unit can, for example, comprise a 3D camera for imaging the object. For such automation, the most precise awareness of the spatial arrangement of the sensor unit relative to the load-bearing device, relative to the load forks, is necessary. Only in this manner can it be ensured that a load carrier recognized by the sensor unit is precisely picked up by the load carrier. The sensor unit is calibrated for this purpose. The spatial arrangement of the sensor unit determined in the context of the calibration process comprises information on the mounting position, i.e., on the three spatial coordinates in a Cartesian coordinate system, and on the mounting angles, i.e., the angular positions of the sensor unit relative to the three spatial axes.

Existing calibration methods provide manually arranging the sensor unit as precisely as possible on the load-bearing device, which is time-consuming and error-prone. To a certain extent, the sensor signal of the sensor unit is evaluated during the calibration method, wherein the industrial truck is moved to a specific position, and optical markers, arranged in the surroundings of the industrial truck, are detected. However this method is also involved. Moreover, calibration is only possible within specific surroundings provided for calibration. In particular, the industrial truck must be moved back into corresponding surroundings for subsequent recalibration.

A method is described in EP 3 219 663 A1 in which both the sensor as well as a reference object used for positioning are arranged on a load fork of the load-bearing device. At regular intervals, the sensor ascertains the position of the reference object, wherein a computer compares the determined position data with saved reference data. The reference object arranged on the load fork restricts the field of vision of the sensor and runs the danger of interfering with or becoming damaged during operation of the industrial truck.

The method of the present disclosure provides a simple calibration method having a high degree of automation for calibrating a sensor unit on an industrial truck.

BRIEF SUMMARY OF THE DISCLOSURE

The method of the present disclosure calibrates a sensor unit on an industrial truck, comprising the following steps:

a) determining a first position of the sensor unit relative to an object located proximal to, or aside from, the industrial truck;

b) displacing the sensor unit relative to the object by a first distance along a first direction;

c) determining a second position of the sensor unit relative to the object; and d) determining the spatial orientation of the sensor unit relative to the load-bearing means or device based on the first and second positions, the direction of movement, and the distance between the first and second positions.

According to the disclosure, the method includes the steps of measuring at least two positions of the sensor unit relative to the object, wherein the sensor unit is displaced between each of the at least two positions in a predetermined direction of movement. The two positions are, in principle, moved away from each other in a predetermined direction of movement along one of the three spatial axes. The distance by which the sensor unit is moved between the two positions can, in principle, be known, e.g., saved in a control unit of the industrial truck. The distance can also be determined subsequently as will be further explained. The sensor unit can in particular be a camera unit and can comprise a 3D camera. The object can, therefore, be imaged at least two different camera positions, wherein the spatial arrangement of the sensor unit relative to the load-bearing device can then be determined from the different images of the object and from the distance of the imaging positions.

In this case, the calibration is performed by determining the spatial arrangement of the sensor unit relative to the load-bearing means. The spatial arrangement determined in the context of calibration signifies the extrinsic parameters of the sensor unit, i.e., the mounting position of the sensor unit relative to the three spatial coordinates x, y, z in a coordinate system of the load-bearing means, or respectively the industrial truck, as well as the mounting angles relative to the spatial coordinates, i.e., in particular the angular positions relative to the X, Y and Z axes, or, rot_x, rot_y, and rot_z, respectively. The steps of determining the spatial arrangement based on the predetermined direction of movement, at least two positions of the sensor unit, and the distance between these positions, can be performed by solving the relevant equations according to the "least linear square method", in particular with a linear line of best fit. In principle, comparable methods can be used, along with closed methods to reach a solution.

The disclosure is based on an awareness that such a sensor unit can be calibrated, as the sensor unit is: (i) displaced or moved between the imaging positions in an known direction, and (ii) a stationary object that is adjacent, or remotely positioned relative to, the industrial truck during the calibration process. On the one hand, the sensor unit can be moved in a predetermined direction between the individual positions. This can be done by using one or more work functions of the industrial truck for displacing the sensor unit. Accordingly, a mast advancement or a mast lift by the industrial truck can be used as the work function in order to move the load-bearing means and accordingly the sensor unit, as will be explained further below. Moreover the object lying aside, or adjacent to, the industrial truck, i.e., not connected to the industrial truck, is stationary, at least during the calibration process. This ensures that the object does not change its position or orientation during the movement of the sensor unit and is accordingly imaged by the sensor unit from different perspectives.

The two position measurements each supply spatial coordinates of the object in a sensor unit coordinate system as well as the distance between the two positions. From this information, the spatial arrangement of the sensor unit on the load-bearing means, or respectively the industrial truck is inferred; i.e., the spatial coordinates, or respectively spatial angles of the sensor unit in a coordinate system of the load-bearing means, or the industrial truck are determined. This results in a coordinate transformation.

The object can be a load carrier, such as a load-pallet, that can be picked up by the industrial truck. According to one embodiment, the load-bearing means can be a load fork with a fork shank and at least one fork arm extending from the fork shank. The sensor unit may then be arranged on the fork shank or on one of the fork arms. In particular, the load-bearing means can have two fork arms extending in parallel from the fork shank. The industrial truck can consequently be a forklift such as a reach truck. The sensor unit can be a 3D camera arranged on the fork shank or on the fork arm, or respectively one of the fork arms. The fork arm or arms lie within an imaging area of the sensor unit.

If the orientation of the load-bearing means relative to the object is not precisely known, in certain circumstances only the mounting angles may be reliably determined; the mounting position is then perhaps only of lesser significance. According to one embodiment, the orientation of the load-bearing means relative to the object may, therefore, be known. The load-bearing means, or respectively the entire industrial truck, can be initially brought into a reference position relative to the object before performing the calibration steps, i.e., before the first positioning. In this reference position, the orientation of the load-bearing means relative to the object is known. The reference position can be a position that is transacted during the subsequent operation of the industrial truck. The reference position can be a position in which the industrial truck can optimally pick up a load carrier with the assistance of the load-bearing means. Accordingly, for example, the load fork can be oriented in the reference position relative to a pallet to be picked up such that the load fork arms can be optimally inserted into the fork pockets of the pallet only by a forward movement of the load forks. In this case, when the position of the fork arms relative to the object is predetermined, the spatial arrangement, including the mounting position of the sensor unit relative to the object, and, therefore to the fork arms, can also be determined. Proceeding from such a reference position, the steps of the calibration method can start, wherein the different position measurements can be carried out at different advancement positions of the thrust mast. The approach to such a reference position allows a particularly precise determination of the spatial arrangement, in particular, the spatial coordinates as well, of the sensor unit relative to the load-bearing means.

Two position measurements at different positions of the sensor unit are sufficient in principle for the calibration method. This holds true at least when all three mounting angles do not have to be determined because at least one of the mounting angles is already known. Accordingly, the sensor unit can be adjustable on the load-bearing means about only two spatial axes, whereas there is no adjustability about the third spatial axis. With regard to this one spatial angle, the spatial arrangement of the sensor unit on the load-bearing means can already be known. To fully ascertain the spatial arrangement, only two mounting angles have to be determined in addition to the three position coordinates. The method according to the disclosure is then particularly simple. The method will be explained, in the subsequent paragraphs, by way of an example.

At the beginning of the method, the industrial truck can initially be positioned by an operator in front of the load carrier so that the load-bearing means can pick up the object by the load carrier as optimally as possible. This reference position may be chosen so that the sensor unit can also recognize the load carrier or the pallet. A first position measurement is performed in this reference position, i.e., a first position of the sensor unit relative to the load carrier is determined. In so doing, a single position measurement, or multiple measurements, can then be carried out, wherein an average is then calculated when using multiple measurements. A pattern recognition can be carried out by the sensor unit for position measurement. For example, the middle of the load carrier front can be determined from the sensor data. In principle, the position can also be established by a user input on a touch screen display. In a subsequent step, the distance from the load-bearing means, and the sensor unit to the load carrier is changed; and the sensor unit is moved relative to the load carrier. This movement is preferably carried out along just one axis, i.e., the z-axis, by a first distance relative to a coordinate system of the industrial truck. This is followed by another position measurement that yields a second position of the sensor unit relative to the load carrier. In an additional step, the Euclidean distance of the two position measurements, according to Pythagoras, is subsequently determined. The spatial arrangement of the sensor unit relative to the load-bearing means can be determined, i.e., from the two positions, the direction of movement, and the distance. With a sensor unit rotationally fixed relative to the load carrier with respect to the z-axis, the mounting position can be determined with reference to spatial axes x, y, z and two mounting angles, rot_x and rot_y.

According to another embodiment, the method comprises the step of determining the distance as the distance between the two positions. As explained, two calibration positions are, in principle, sufficient for determining the spatial arrangement of the sensor unit if at least one mounting angle is known. According to a development of the method, the spatial arrangement of the sensor unit can also be determined including the third rotation. According to this embodiment, the spatial arrangement of the sensor unit relative to the load-bearing means having the sensor unit can be determined based, not just two positions and the distance between these two positions, but rather on (i) a total of at least three positions, (ii) the directions of movement, (iii) the distance between the first position and the second position, and (iv) the distance between the second position and the third position. Consequently, the method can employ the following steps after the step of determining the second position. These steps include: (a) moving or displacing the sensor unit by a second distance relative to the object along a predetermined second direction perpendicular or orthogonal to the first direction, (b) determining a third position of the sensor unit relative to the object, and (c) determining the spatial arrangement of the sensor unit relative to the load-bearing means based on: (i) the three positions, (ii) the two directions of movement, and (iii) the two distances. The sensor unit is moved along the second direction, in particular, with the assistance of another work function of the industrial truck that operates orthogonally to the first work function. This can be the mast lift that moves the load-bearing means and, the sensor unit perpendicular to the mast advancement.

A system of equations then results that can also be solved using the method of the least linear square. The result is the spatial arrangement of the sensor unit relative to the load-bearing means, wherein the arrangement in this case comprises the mounting position relative to the spatial axes x, y, z as well as the three mounting angles rot_x, rot_y, rot_z relative to these axes.

According to one embodiment, the distances are determined according to the distance between the particular positions. As previously mentioned, the first distance, or the second distance, by which the sensor unit is moved relative to the object, can in principle be known beforehand. According to the present embodiment, these distances do not have to be known but may be determined. Before determining the spatial arrangement of the sensor unit, initially the first distance and/or, the second distance may be determined. The distances are determined in this context in particular as the Euclidean distance between the particular position measurements; the first distance as the Euclidean distance between the first position P1 and the second position P2, and/or the second distance as the Euclidean distance between the second position P2 and the third position P3, according to the Pythagorean theorem. The calibration according to the disclosure can also be used for initially unknown distances. In particular, the method can also be used without positioning means such as position sensors. In principle, it can however also be provided that the first distance and/or the second distance are determined by a positioning system.

According to another embodiment, the sensor unit ban be moved relative to the object along only one spatial axes. For example, the first direction can be the z-axis, and the second direction, if provided, can be the y-axis. The sensor unit can then be moved by the first distance along the z-axis, whereas the movement by the second distance is along the y-axis perpendicular to the z-axis. This can greatly simplify the determination of the spatial arrangement of the sensor unit.

As already mentioned, the sensor unit can be moved in different ways relative to the object. Therefore, the sensor unit is moved by displacing the industrial truck itself relative to the object. For example, the industrial truck can be moved forward toward the object or away from the object between two position measurements along the z-axis. According to one embodiment, the sensor unit can also be moved relative to the object by retracting or advancing a thrust mast of the industrial truck bearing the load-bearing means, and/or by retracting or advancing a lift mast of the industrial truck bearing the load-bearing means. Accordingly by advancing the thrust mast, the sensor unit can be moved the first distance along the first direction of movement, along the z-axis, and the second distance by then advancing the lift mast, along the y-axis, along the second direction of movement. The use of the orthogonal work functions enables a particularly well-defined movement which leads to a simple and easily automated calibration method.

According to one embodiment, the determined spatial arrangement of the sensor unit is shown on a display unit of the industrial truck. Accordingly, in particular the orientation of the load-bearing means relative to the load carrier can be shown on the display unit. An operator of the industrial truck can recognize whether the industrial truck is correctly oriented for picking up the load carrier.

According to one embodiment, the calibration process may be repeated during the operation of the industrial truck. The calibration process, i.e., the calibration method according to the disclosure can also be used according to this embodiment during the operation of the industrial truck. As the inventor has recognized, the mounting position of the sensor unit can change from external influences during the subsequent operation of the industrial truck following the initial calibration process. Such external influences can be impacts, or collisions, or also a cleaning of the industrial truck, or respectively the sensor unit. This can cause the spatial arrangement of the sensor unit determined and in particular saved in a control unit of the industrial truck to no longer correspond with the actual spatial arrangement. A load carrier can consequently no longer be picked up precisely enough in certain circumstances. There is also the danger of property damage, or respectively personal injury. This problem can be solved by employing the calibration technique of the present disclosure wherein another calibration is performed during operation of the industrial truck. Furthermore, a new calibration process can be performed at regular intervals in time during operation to mitigate damage or risk of personal injury.

According to one embodiment, the calibration process may be initiated by an operator at any time using an operating element of the industrial truck. The operator can choose when the calibration should occur. In particular, another calibration that may be provided which occurs during the operation of the industrial truck can accordingly be started by the operator at the desired time. To accomplish this, the operator can first move the industrial truck into the above-explained reference position relative to the load carrier. The calibration process can however also be fully automated. Accordingly, in particular the reference position as well can be started fully automatically by the industrial truck after starting the calibration process.

The disclosure, moreover, relates to an industrial truck having a computer processor that is designed to execute the foregoing method steps. The determined spatial arrangement of the sensor unit can be saved in the control unit of the industrial truck.

BRIEF DESCRIPTION OF THE DRAWINGS

The present disclosure is described in the context of, and with reference to, the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION OF THE DISCLOSURE

Figure 1:
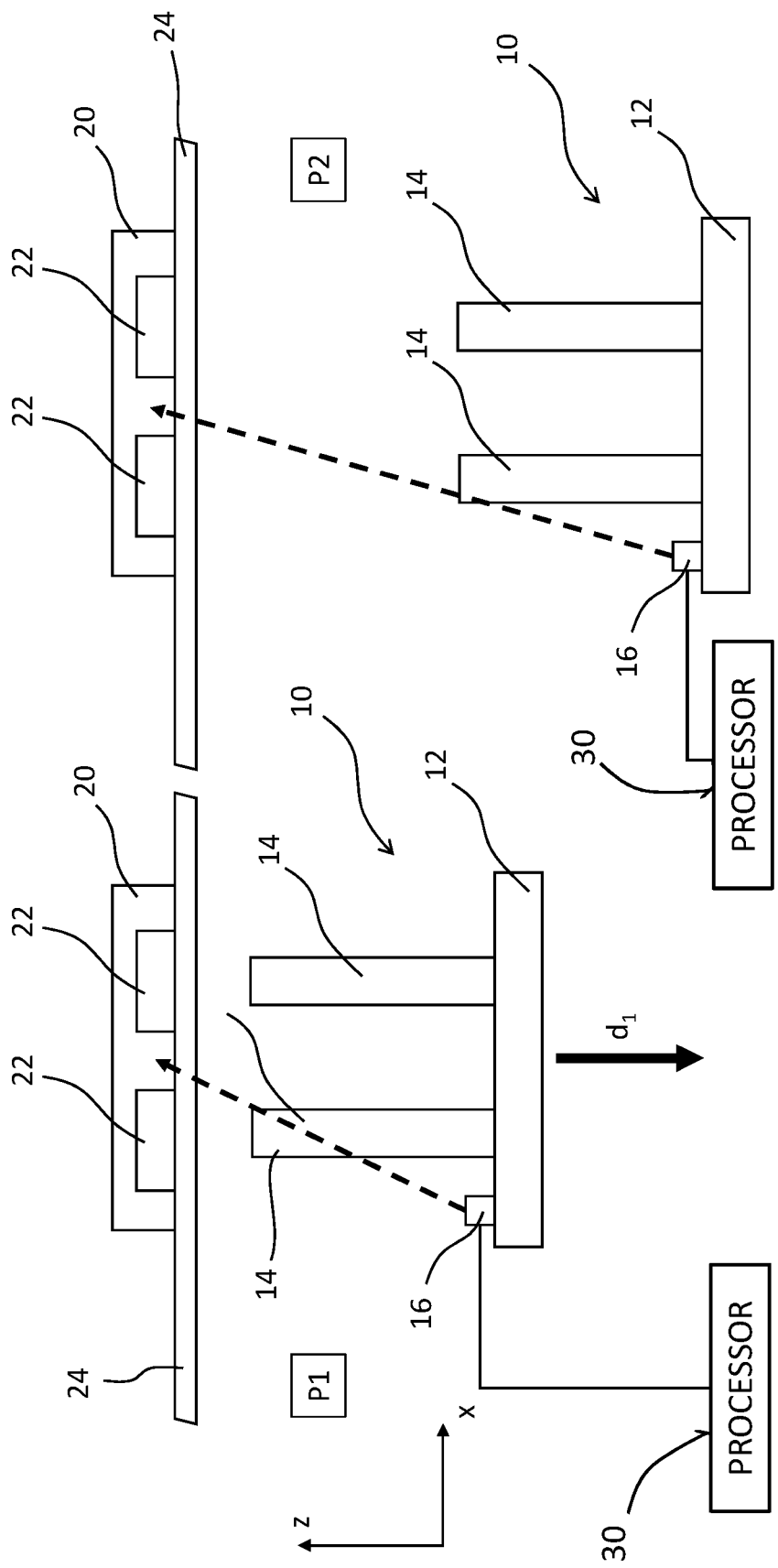
FIGS. 1a and 1b show two schematic views, respectively, of a load-bearing device or means and a load carrier in a birds-eye view from the load-bearing device.

In FIGS. 1a and 1b, a load-bearing device or means 10 includes a fork shank 12 and two fork arms 14 extending from the fork shank 12. A sensor unit 16 is mounted to or otherwise arranged on the fork shank 12. In FIGS. 1a, 1b, the load-bearing device 10 is arranged at various distances from a load carrier such as a lifting pallet 20. The pallet 20 is arranged on a base 24 and includes two fork pockets 22 for receiving the fork arms 14 of the load-bearing device 10. Whereas the load-bearing device 10 is shown in FIGS. 1a, 1b in a birds-eye view, the pallet 20 is shown in a side view looking toward the fork openings 22.

The sensor unit 16 serves to recognize the pallet 20 and is intended to allow the insertion of the fork arms 14 of the load-bearing device 10 as precisely as possible into the fork pockets 22 of the pallet 20. The sensor unit 16 may comprise a camera, such as a 3D camera. Through a control unit or computer processor 30, an industrial truck having the load-bearing device 10 can recognize the pallet 20 by means of the sensor unit 16. This is particularly necessary for automatically operating the industrial truck. In this context, it is important for the precise arrangement of the sensor unit 16 on the load-bearing device 10 to be known and saved in the control unit of the industrial truck since the precise position of the load-bearing means relative to the pallet can only be derived or inferred from the sensor image (i.e., in particular from the camera picture) in this manner. To accomplish this, the sensor unit must first be calibrated.

To calibrate the sensor unit, the industrial truck is first positioned in front of the pallet 20, by an operator, so that the load-bearing device 10 can pick up the pallet 20 as optimally as possible. The positioning can be carried out such that the fork arms 14 can only enter the fork pockets 22 as centrally as possible by a forward movement of the load-bearing means. This reference position is chosen so that the sensor unit 16 can also recognize the pallet 20. A first position measurement that yields a first position P1 is performed, i.e., a first position of the sensor unit 16 relative to the pallet 20 is determined. This may be understood by examining FIG. 1a. In so doing, a single position measurement, or a multiple measurement, can then be performed. An average is calculated when taking multiple measurements. A pattern recognition, of the middle of the load carrier front, may be conducted by the sensor unit for position measurement.

In a subsequent step, the distance from the fork shank 12, and the sensor unit 16 to the pallet 20 is changed; such that the sensor unit 16 is moved relative to the pallet 20. This movement is carried out along one axis such as the z-axis, by a first distance d1 relative to a coordinate system of the industrial truck in a known first direction. This movement can be carried out in particular by shifting the thrust mast towards the rear of the industrial truck. The load-bearing device 10 may be shifted from the position relative to the pallet 20 shown in FIG. 1a to the position relative to the pallet 20 shown in FIG. 1b. Then, the position is measured once again at the position of the load-bearing means, visible in FIG. 1b, which yields a second position P2 of the sensor unit 16 relative to the pallet 20. In an additional step, a Euclidean distance d1 between the two positions P2 and P1, according to Pythagoras, may be determined. The spatial arrangement of the sensor unit 16 relative to the load-bearing device 10 can be determined from the two positions P1, P2 as well as the distance d1.

To accomplish this, the following equation can be solved using the least linear square:

$$T(x,y,z,\text{rot\_}x,\text{rot\_}y,0)*P1=T(0,0,d,0,0,0)*T(x,y,z,\text{rot\_}x,\text{rot\_}y,0)*P2$$

This equation is based on the theory of the affine image and the expanded image matrix. $T(x,y,z,\text{rot\_}x,\text{rot\_}y,0)$ represents the image matrices, whereas $T(0,0,d,0,0,0)$ represents a movement vector. The solution to the equation yields the mounting positions x, y, z as well as the mounting angles rot_x, rot_y and, therefore, the spatial arrangement of the sensor unit relative to the load-bearing means. It was assumed that a rotation of the sensor unit about the z-axis is not practical, due to the stationary mounting of the sensor unit relative to or on the fork shank. This facilitates the calibration method.

In principle however, the third rotation rot_z can also be determined. To accomplish this, another position measurement is necessary. Accordingly, a third position can be approached by means of another work function of the industrial truck in a direction that is orthogonal to the work function of the mast advancement. In this case, this can be a mast lift that can displace the load-bearing device 10 along a perpendicular y-axis in FIG. 1. Accordingly after the second position measurement, the sensor unit 16 can again be moved relative to the pallet 20 along the y-axis by a second distance $d_2$ (not shown). In the third position P3 (not shown) that is approached in this manner, the sensor unit 16 is again positioned relative to the pallet 20. Subsequently, the Euclidean distance $d_2$ to the previously determined second position is determined. Then the spatial arrangement can again be determined using the least linear square, but this time based on the three positions P1, P2, P3 and the two distances $d_1$, $d_2$. The equations are as follows:

$$T(x,y,z,\text{rot\_}x,\text{rot\_}y,\text{rot\_}z)*P=T(0,0,d,0,0,0)*T(x,y,z,\text{rot\_}x,\text{rot\_}y,\text{rot\_}z)*P2, \text{ and}$$

$$T(x,y,z,\text{rot\_}x,\text{rot\_}y,\text{rot\_}z)*P1=T(0,d\_2,d,0,0,0)*T(x,y,z,\text{rot\_}x,\text{rot\_}y,\text{rot\_}z)*P3$$

By solving the above equation, the spatial arrangement of the sensor unit i.e., comprising the coordinates x, y, z, rot_x, rot_y as well as rot_z, can be determined. The different positions at which the measurements are carried out are chosen so that the detection of the object by means of the sensor unit functions reliably, i.e., in particular low sensor noise occurs. To accomplish this, the distance between the positions should be chosen to be sufficiently large.

According to the calibration method of the present disclosure, the spatial arrangement of the sensor unit on the load-bearing means can be determined very precisely. Accordingly, during subsequent operation of the industrial truck, it can be ensured that a pallet imaged by the sensor unit is also situated precisely at the location that results from the image data, i.e., the camera picture. Accordingly, the precise orientation of the load-bearing means relative to the pallet can be determined and a reliable/precise pick-up of the pallet by the load-bearing means can be ensured.

The method according to the disclosure for determining the spatial arrangement of a sensor unit relative to a coordinate system A of the load-bearing means is based on the concept that the coordinate system A moves relative to the industrial truck in a known direction during the calibration process through one or more work functions of the industrial truck. By imaging the pallet as an object that is stationary at least during the calibration process and lying aside from the industrial truck in different positions, measured in the Cartesian coordinate system B of the sensor unit, the sensor unit can be easily calibrated. In so doing, the coordinates are transformed as can be seen by examination of FIG. 2.

Figure 2:
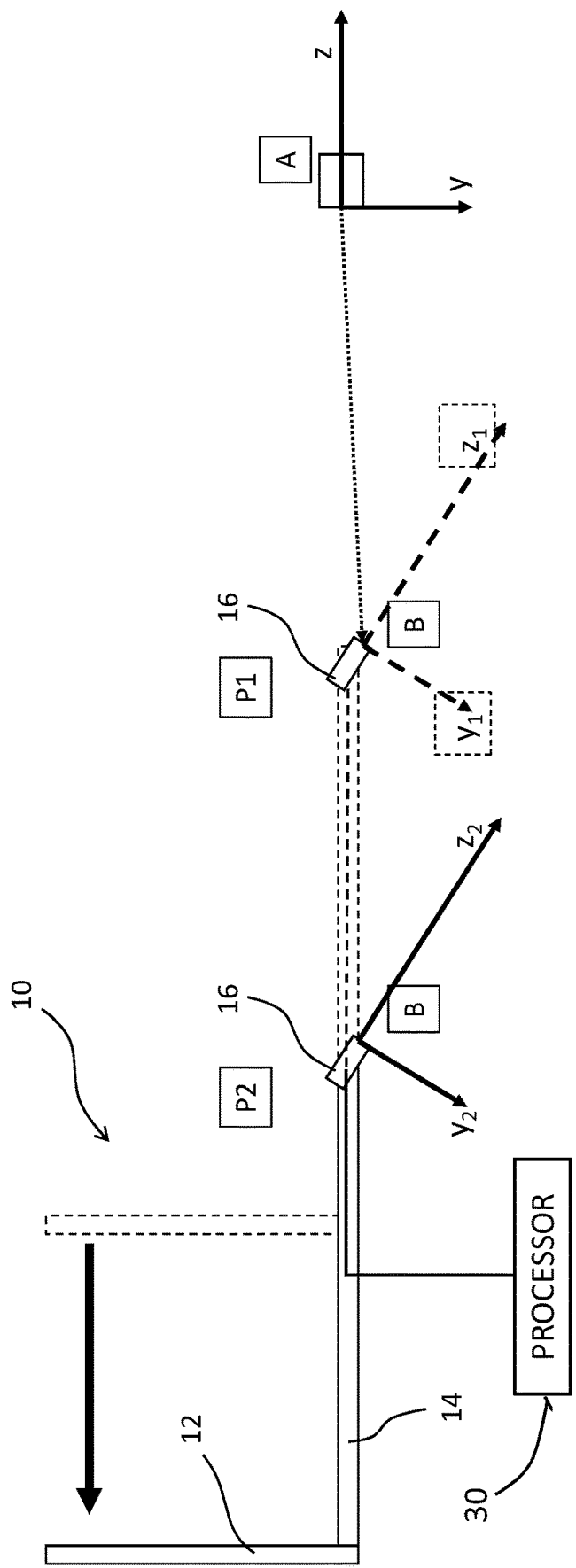
FIG. 2 shows a schematic side view of the load-bearing device and a sensor unit mounted to a fork arm of the load-bearing device.

In FIG. 2, the sensor unit 16 is arranged on one of the forks 14 of the load-bearing device 10; however, the sensor unit can, alternatively, be arranged on the fork shank 12. In comparison to the first position P1, the load-bearing device 10 and the sensor unit 16 at the second position P2 are shifted by the distance $d_1$ along the z-axis by the mast advancement (as previously explained in FIGS. 1a and 1b. The first position P1 is illustrated by dashed lines in FIG. 2. As can be seen, the sensor unit 16 is arranged angled downwardly. The measurement of the position at position P1 yields three spatial coordinates $x_1$, $y_1$, $z_1$ in the coordinate system B, whereas the measurement of the position at position P2 yields three spatial coordinates $x_2$, $y_2$, $z_2$ in coordinate system B. In the explained manner, a conversion to coordinate system A is carried out based on positions P1 and P2 as well as the distance $d_1$ lying therebetween.

The employed sensor unit can in principle be any sensor suitable for detecting three spatial coordinates such as a 3D camera, a time-of-flight sensor, a 3D LIDAR, ultrasound or microwave radar, 2D cameras are also useful to the extent that the positioning is carried out with reference to an object of a known size, or is carried out by recognizing elements such as markers arranged on the object.

LIST OF REFERENCE SINS

10 Load bearing means
12 Fork shank
14 Fork arms
16 Sensor unit
20 Pallet
22 Fork pocket
24 Base
A, B Coordinate system
P1 First position
P2 Second position
$d_1$ First distance

The invention claimed is:

1. A method for calibrating a sensor unit on a load-bearing device of an industrial truck, comprising the steps of:
    (a) determining a first position of the sensor unit relative to an object remotely located relative to the industrial truck and issuing a first position signal indicative thereof;
    (b) displacing the sensor unit relative to the object in a first direction by a prescribed distance and issuing a first direction signal indicative thereof;
    (c) determining a second position of the sensor unit relative to the object and issuing a second position signal indicative thereof; and
    (d) determining a spatial orientation of the sensor unit relative to the load-bearing device using a computer processor, wherein the spatial orientation is determined using the first and second position signals and the first direction signal to determine a first distance between the first and second positions of the sensor unit.

2. The method of claim 1, wherein the object is a load carrier configured to be picked up by the industrial truck.

3. The method of claim 2, wherein the load carrier is a lift pallet.

4. The method of claim 1, wherein the load-bearing device comprises a fork arm projecting from a fork shank; and further comprising the step of: configuring the sensor unit to mount to one of the fork shank and the fork arm.

5. The method of claim 1, further comprising the step of: predetermining an orientation of the load-bearing device relative to the object.

6. The method of claim 1, further comprising the step of: predetermining a reference position for the sensor unit relative to the object.

7. The method of claim 1, further comprising the step of: predetermining at least one spatial angle of the sensor unit relative to the load-bearing device.

8. The method of claim 1, further comprising the steps of:
    (e) displacing the sensor unit relative to the object along a second direction by a prescribed distance, the second direction orthogonal to the first direction, and issuing a second direction signal indicative thereof;
    (f) determining a third position of the sensor unit relative to the object and issuing a third position signal indicative thereof, and
    (g) determining the spatial orientation of the sensor unit relative to the load-bearing device using the computer processor, the computer processor responsive to the first, second and third position signals and the first and second direction signals to determine a second distance between the second and third positions of the sensor unit.

9. The method of claim 8, further comprising the steps of: predetermining one of the first and second distances.

10. The method of claim 9, wherein the steps of predetermining one of the first and second distances further comprise the step of: determining the distance between the first and the second positions as a Euclidean distance.

11. The method of claim 9, wherein the steps of predetermining one of the first and second distances further comprise the step of: determining the distance between the second and the third positions a Euclidean distance.

12. The method of claim 8, further comprising the step of: displacing the sensor unit along a single spatial axis.

13. The method of claim 1, wherein the step of displacing the sensor unit relative to the object is performed by displacing the industrial truck relative to the object.

14. The method of claim 1, wherein the step of displacing the sensor unit relative to the object is performed by retracting or advancing a thrust mast of the industrial truck.

15. The method of claim 1, wherein the step of displacing the sensor unit relative to the object is performed by retracting or advancing a lift mast of the industrial truck.

16. The method of claim 1, further comprising the step of: repeating steps (a) through (d) to calibrate the sensor unit during operation of the industrial truck.

17. The method of claim 1, further comprising the step of: initiating calibration of the sensor unit by an operator using an operating element of the industrial truck.

18. A system for calibrating a sensor unit disposed on a load-bearing device of an industrial truck, comprising:
    a position sensor configured to determine a first position of the sensor unit relative to an object remotely located relative to the industrial truck and issuing a first position signal indicative thereof;
    a displacement device configured to move the sensor unit relative to the an object in a first direction by a prescribed distance and issuing a first direction signal indicative thereof;
    the position sensor configured to determine a second position of the sensor unit relative to the object following displacement of the sensor unit by the prescribed distance and issuing a second position signal indicative thereof; and
    a computer processor, responsive to the first and second position signals and the first direction signal, for determining a first distance between the first and second positions of the sensor unit, and determining a spatial orientation of the sensor unit relative to the load-bearing device using the first and second position signals and the first direction signal to determine a first distance between the first position and the second position of the sensor unit.

19. The system of claim 18, wherein the displacement device is configured to move the sensor unit relative to the object in a second direction by a prescribed distance and issuing a second direction signal indicative thereof;
    the position sensor configured to determine a third position of the sensor unit relative to the object and issuing a third position signal indicative thereof; and
    wherein the computer processor, is responsive to the first, second and third position signals and the first and second direction signals to: (i) determine a second distance between the second and third positions of the sensor unit, and (ii) determine the spatial orientation of the sensor unit relative to the load-bearing device for calibrating the sensor unit.

20. The system of claim 18, wherein the displacement device is configured to move the sensor unit relative to the object in a second direction by a prescribed distance and issuing a second direction signal indicative thereof to the computer processor.

* * * * *